(12) United States Patent
Wang

(10) Patent No.: US 7,422,321 B2
(45) Date of Patent: Sep. 9, 2008

(54) EYEWEAR STRUCTURE COMBINABLE WITH AN ACCESSORY GLASSES UNIT

(76) Inventor: Fu-Yen Wang, No. 18, Lane 214, Changma Rd., Changhua City (TW)

( * ) Notice: Subject to any disclaimer, the term of this patent is extended or adjusted under 35 U.S.C. 154(b) by 0 days.

(21) Appl. No.: 11/477,606

(22) Filed: Jun. 30, 2006

(65) Prior Publication Data

US 2008/0002142 A1    Jan. 3, 2008

(51) Int. Cl.
*G02C 7/08* (2006.01)
(52) U.S. Cl. .............................. 351/57; 351/47; 351/110
(58) Field of Classification Search ................... 351/47, 351/48, 57, 58, 110
See application file for complete search history.

(56) References Cited

U.S. PATENT DOCUMENTS 5,940,162 A * 8/1999 Wong ........................... 351/47

* cited by examiner

*Primary Examiner*—Huy Mai

(74) *Attorney, Agent, or Firm*—Troxell Law Office, PLLC

(57) ABSTRACT

An eyewear structure combinable with an accessory glasses unit comprises a main glasses unit and an accessory glasses unit each having assembly bores drilled at a bridge thereon wherein attracting elements with insert grooves and attracted elements with insert rod are respectively combined with magnetic elements and embedded to the assembly bores of the main and accessory glasses units. Via the magnetism generated by the magnetic elements, the attracting and attracted elements can be magnetically attached to one another to obtain magnetic and insert positioning effects so that the accessory glasses unit can be stably clipped onto the main glasses unit thereby. Besides, each glass of the main glasses unit has a restricting hole drilled thereon to fit to a restricting protrusion of a temple hinge so that the temple hinge can be firmly located onto the glass and restrained in movement, facilitating easy and fast assembly and manufacturing thereby.

10 Claims, 12 Drawing Sheets

EYEWEAR STRUCTURE COMBINABLE WITH AN ACCESSORY GLASSES UNIT

BACKGROUND OF THE INVENTION

The present invention relates to an eyewear structure combinable with an accessory glasses unit wherein attracting elements with insert grooves and attracted elements with insert rod are respectively combined with magnetic elements and embedded to a main glasses unit and an accessory glasses unit; whereby, via the magnetism generated by the magnetic elements, the attracting and attracted elements can be magnetically attached to one another with magnetic and insert positioning effects so as to stably clip the accessory glasses unit onto the main glasses unit thereby. Besides, each glass of the main glasses unit has a restricting hole drilled thereon to fit to a restricting protrusion of a temple hinge so that the temple hinge can be firmly located onto the glass and restrained in movement thereby, facilitating easy and fast assembly and manufacturing thereby.

A conventional eyewear structure includes a main glasses unit 10 combinable with an accessory glasses unit 11 as shown in FIG. 1. The main glasses unit 10 and the accessory unit 11 are respectively equipped with a bridge 101, 111 having magnetic elements 12, 13 embedded in both left/right sides thereon to be magnetically attracted to each other for location thereby. However, the magnetic elements 12, 13 of the main glasses unit 10 and the accessory glasses unit 11 are magnetically attached to each other via simple flat abutment. In case the accessory glasses unit 11 is affected by great force or accidentally touched in application, the magnetic elements 12, 13 will be horizontally displaced as shown in FIG. 2, or even get sliding off from their positions thereof. As a result, an insert groove 14 and an insert block 15 are respectively disposed at one side of the bridges 101, 111 thereon as shown in FIG. 3 so as to reinforce the combination of the accessory glasses unit 11 with the main glasses unit 10 thereby, which, however, can increase the cost of production and destroy the appearance of the main glasses unit 10 as a whole. In addition, the insert block 15, mounted to the insert groove 14 with a gap left there-between, tends to unstably slide back and forth in the insert groove 14 as shown in FIG. 4 when a wearer runs or jumps in movement. Furthermore, the insert block 15 must be corrected in position to fit to the insert groove 14 for location therein, which makes speedy clipping on and off of the accessory glasses unit 11 rather difficult and inconvenient to be done. And, in the repeated clipping on and off of the accessory glasses unit 11, the insert groove 14 and the insert block 15 tend to rub against the inner surface of the bridges 101, 111 and abrade the painted surface thereof, causing the paint to come off there-from as to ruin the appearance of the conventional eyewear and make it rather uncompetitive in the market.

Please refer to FIG. 5. A conventional rimless glasses structure includes a pair of glasses 10' each having stepwise-diameter and oval-shaped grooved bore 103' drilled at an outer surface 101' to connect to a thru-hole 104' disposed at an inner surface 102' thereon. A temple hinge 11' has a front portion equipped with an insert block 111' identical-shaped like the grooved bore 103' and defined by a screw hole 112' therein. When the insert block 111' is accommodated into the grooved bore 103', a locking element 12' is mounted from the thru-hole 104' of the inner surface 102' to secure onto the screw hole 112' of the insert block 111' thereof so that the temple hinge 11' connected to a glass temple 13' is stably fixed onto the glass 10' to provide a rimless glass thereby.

There are some drawbacks to the rimless glass as shown in FIG. 5. Most of all, in manufacturing thereof, the grooved bore 103' of the glass 10' must be singularly molded into a bore caliber, and the thru-hole 104' drilled must be made to match to the screw hole 112' of the temple hinge 11' thereof. And, the thru-holes 104' drilled at both glasses 10' are apt to get awry and become defective, which, poor in their stability thereof, can increase the cost of maintenance as a result.

Please refer to FIG. 6. Another conventional rimless glasses comprises a pair of glasses 20 each having more than one positioning bore 21, 22 drilled at both lateral sides thereon, to which more than one positioning rod 231 protruding at a temple hinge 23 and a bridge thereon respectively is securely mounted therewith for location thereby.

There are some disadvantages to the second rimless glasses structure as shown in FIG. 6. Most of all, the positioning bores 21, 22 of the glass 20 must be appropriately spaced to match to the positioning rods 231 of the temple hinge 23, and the bridge thereof, which is rather complicated in the manufacturing and, thus, must depend on professional persons to carry out the drilling and cutting operation thereof. And, once either of the two positioning bores 21, 22 is mistakenly drilled in slight difference, the positioning rods 231 cannot be smoothly assembled thereto, and must be dumped as defective products. Even when the positioning rods 231 are forced into the positioning bores 21, 22, the temple hinge 23 used for a period of time will go awry and become difficult to be adjusted. Furthermore, the positioning rods 231 and the positioning bores 21, 22 are directly joined to each other, which, over long time of abrasion, will get worn off and cracks as to ruin the appearance of the glasses 20. Thus, the glasses 20 must be replaced frequently and are reduced in their durability in application.

SUMMARY OF THE PRESENT INVENTION

It is, therefore, the primary purpose of the present invention to provide an eyewear structure combinable with an accessory glasses unit wherein, via the magnetism generated by magnetic elements, attracting elements of a main glasses unit and attracted elements of an accessory glasses unit can be magnetically attached to one another and insert rods of the attracted elements thereof are allowed to precisely fit to insert grooves of the attracting elements for the purposes of magnetic and insert positioning effects thereby so that the accessory glasses unit can avoid the risk of sliding unstably around on the main glasses unit as found in the aforementioned prior art, achieving better stability and allowing lightweight and flexible application thereby.

It is, therefore, the second purpose of the present invention to provide an eyewear structure combinable with an accessory glasses unit wherein the magnetic elements of the main glasses unit and the accessory glasses unit are respectively combined with the attracting elements and the attracted elements that, having magnetic conducting capability, are respectively equipped with the insert grooves and the insert rods to be correspondingly fit to one another for location thereby so that the accessory glasses unit won't abrade against a bridge of the main glasses unit, and the paint coated thereon won't get worn out to achieve an anti-rusting effect for the best application state thereby.

It is, therefore, the third purpose of the present invention to provide an eyewear structure combinable with an accessory glasses unit wherein each glass of the main glasses unit is equipped with a restricting hole drilled thereon to fit to a restricting protrusion of a temple hinge so that the temple hinge can be firmly held in place onto the glass and restrained in movement thereby, facilitating easier and faster manufacturing as well as assembling thereof.

It is, therefore, the fourth purpose of the present invention to provide an eyewear structure combinable with an accessory glasses unit wherein a protective plug is mounted between the restricting hole of the glass and the restricting protrusion of the temple hinge thereof for separating purpose. In addition to exerting a complete protection of the glasses from the danger of wearing off in the process of assembly, the protective plug can also be easily replaced in case of flexible fatigue due to the long-time abutment of the restricting protrusion, efficiently reducing the replacement rate of the conventional glasses to boost the quality and durable use of the glasses thereby.

DETAILED DESCRIPTION OF THE PREFERRED EMBODIMENTS

Figure 1:
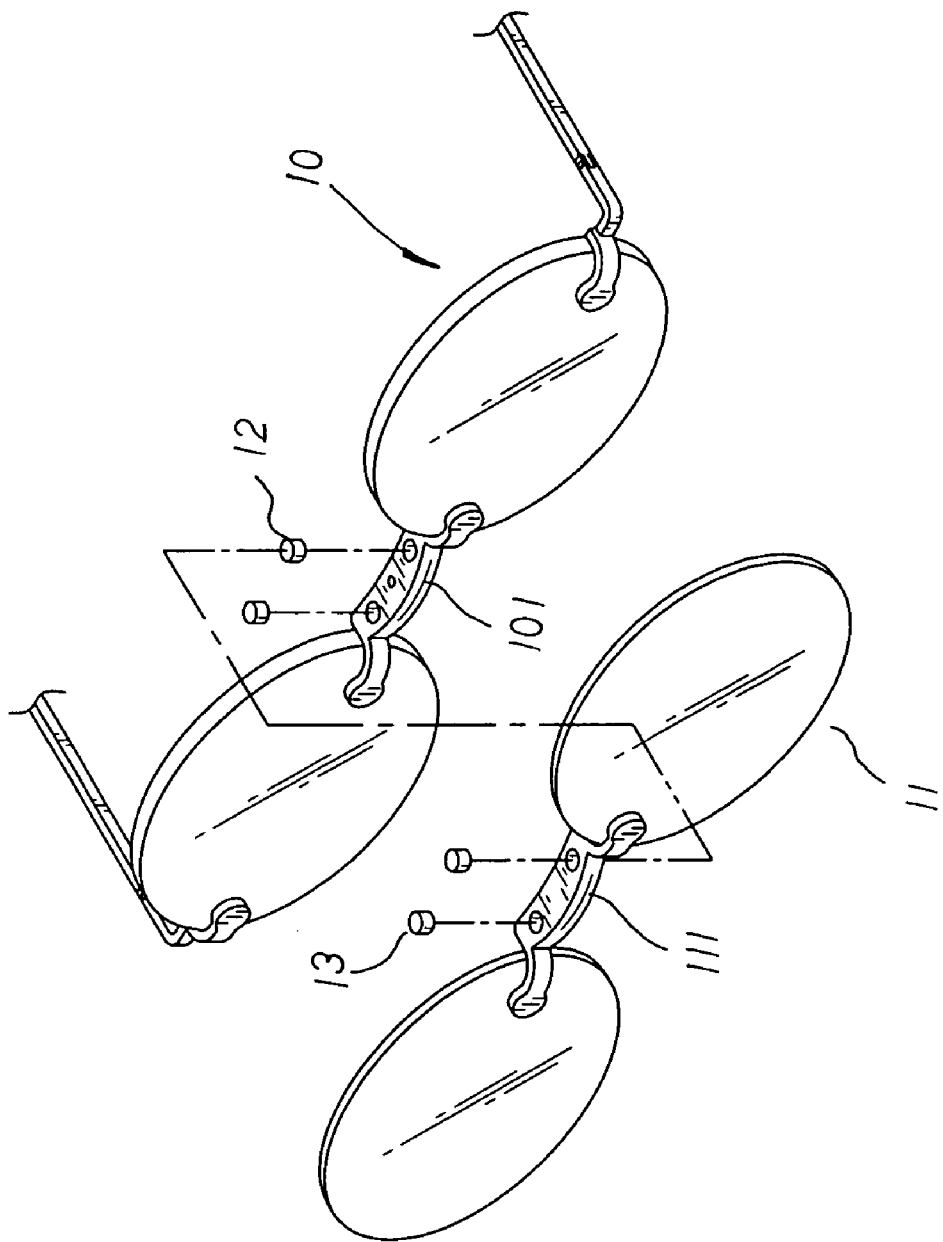
FIG. 1 is an exploded perspective view of a conventional eyewear structure.
Figure 2:
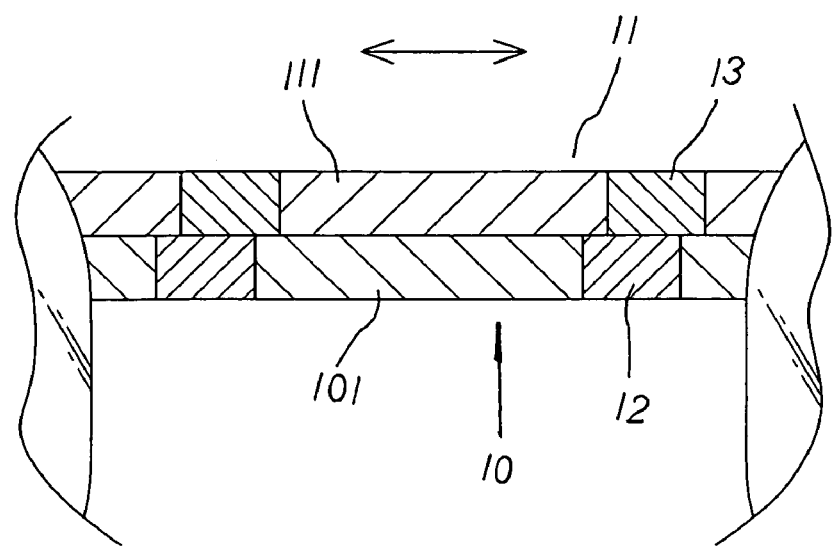
FIG. 2 is a partially cross sectional view of FIG. 1.
Figure 4:
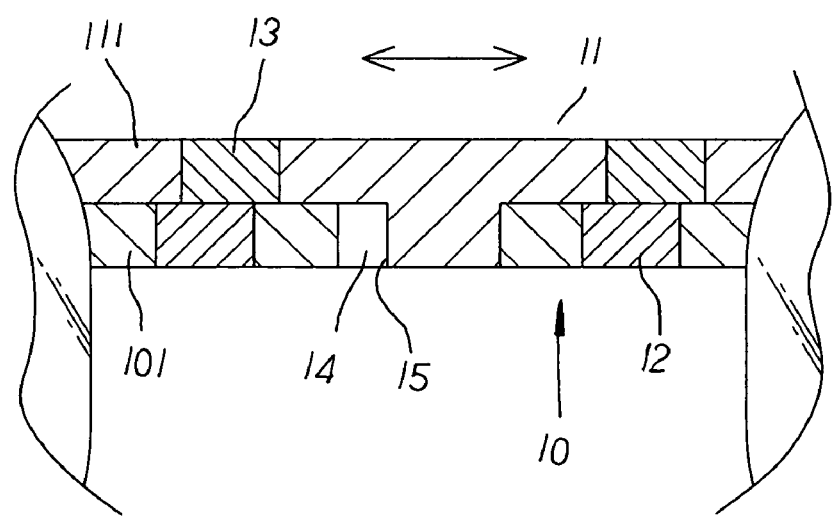
FIG. 4 is a partially cross sectional view of FIG. 3.
Figure 3:
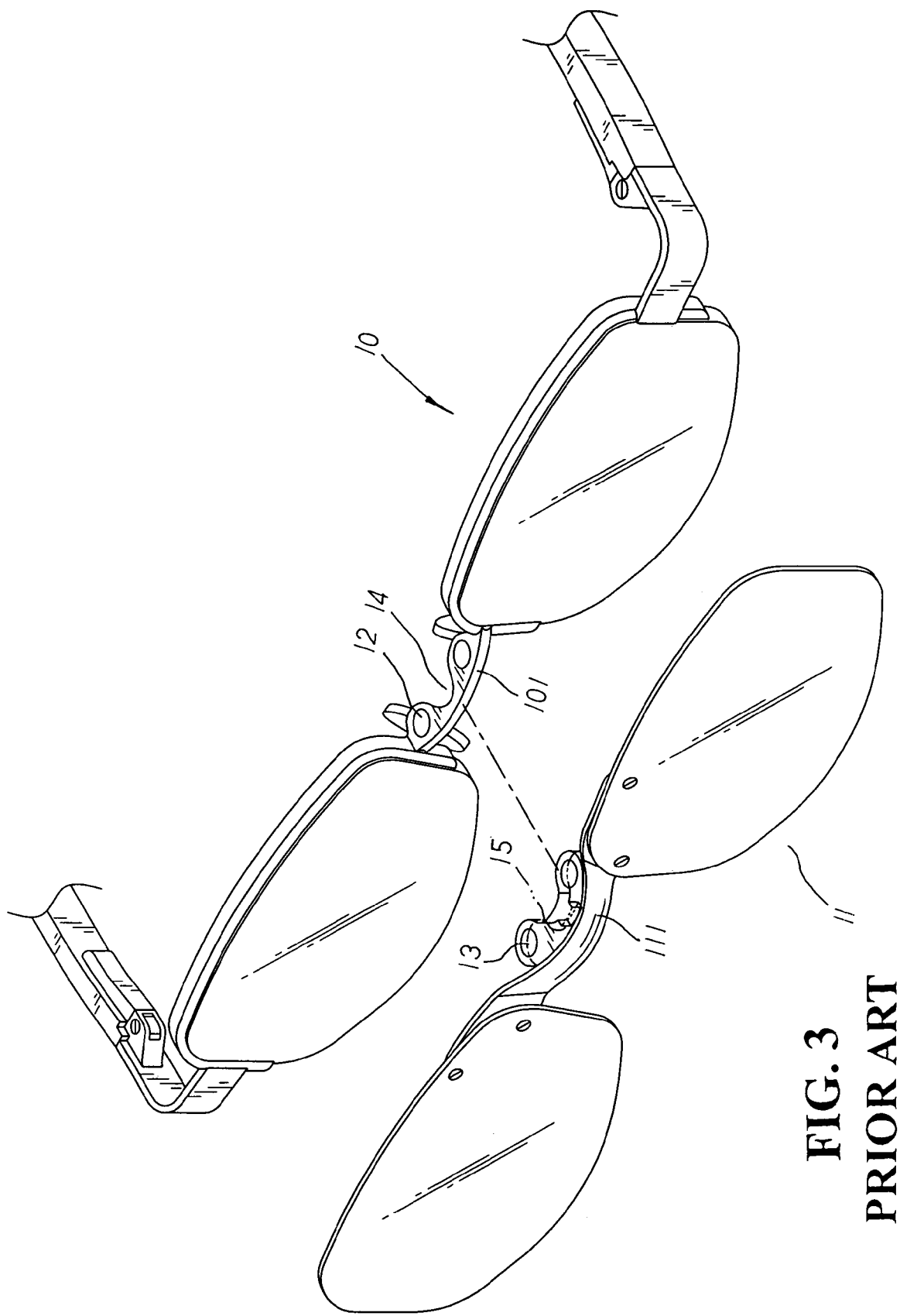
FIG. 3 is an exploded perspective view of another conventional eyewear structure.
Figure 5:
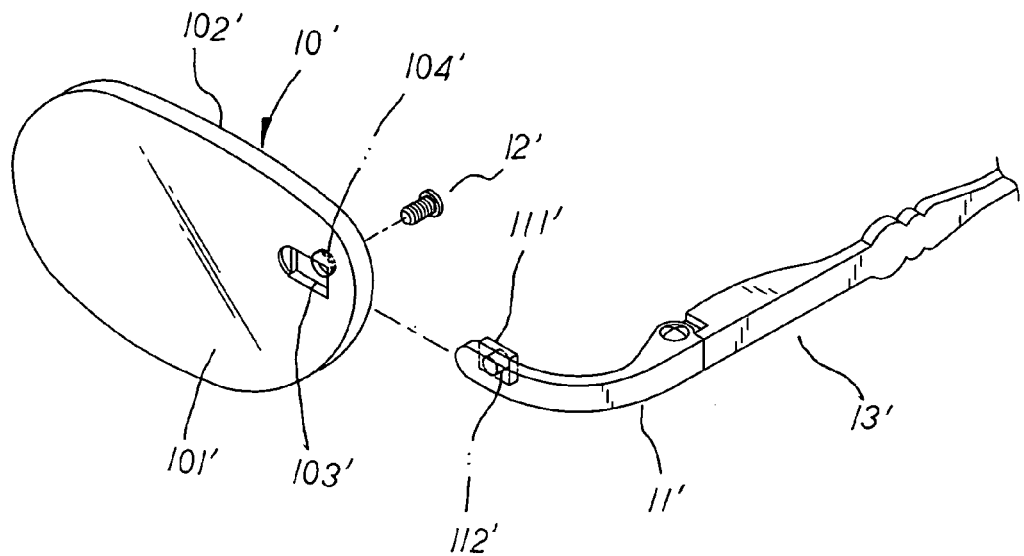
FIG. 5 is an exploded perspective view of a Taiwan Patent No. 87210438.
Figure 6:
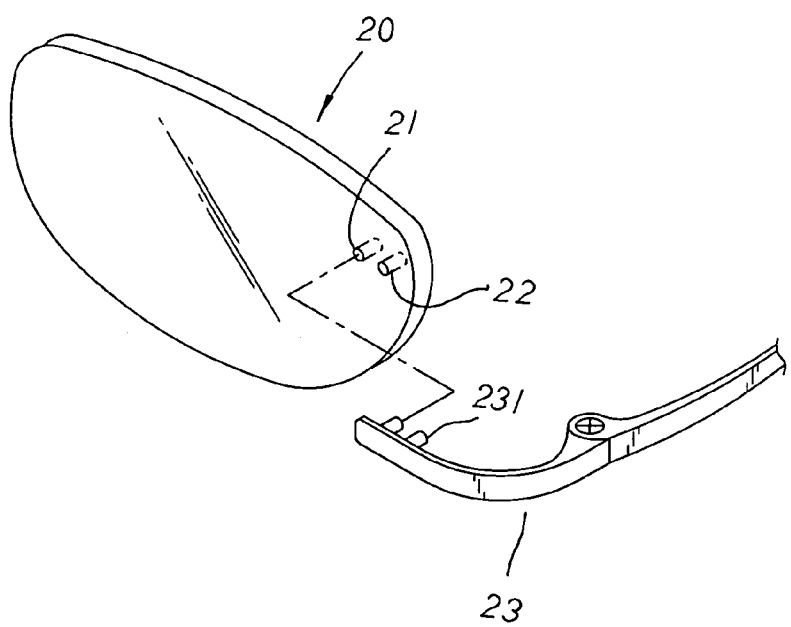
FIG. 6 is an exploded perspective view of another Taiwan Patent No. 93212208.
Figure 7:
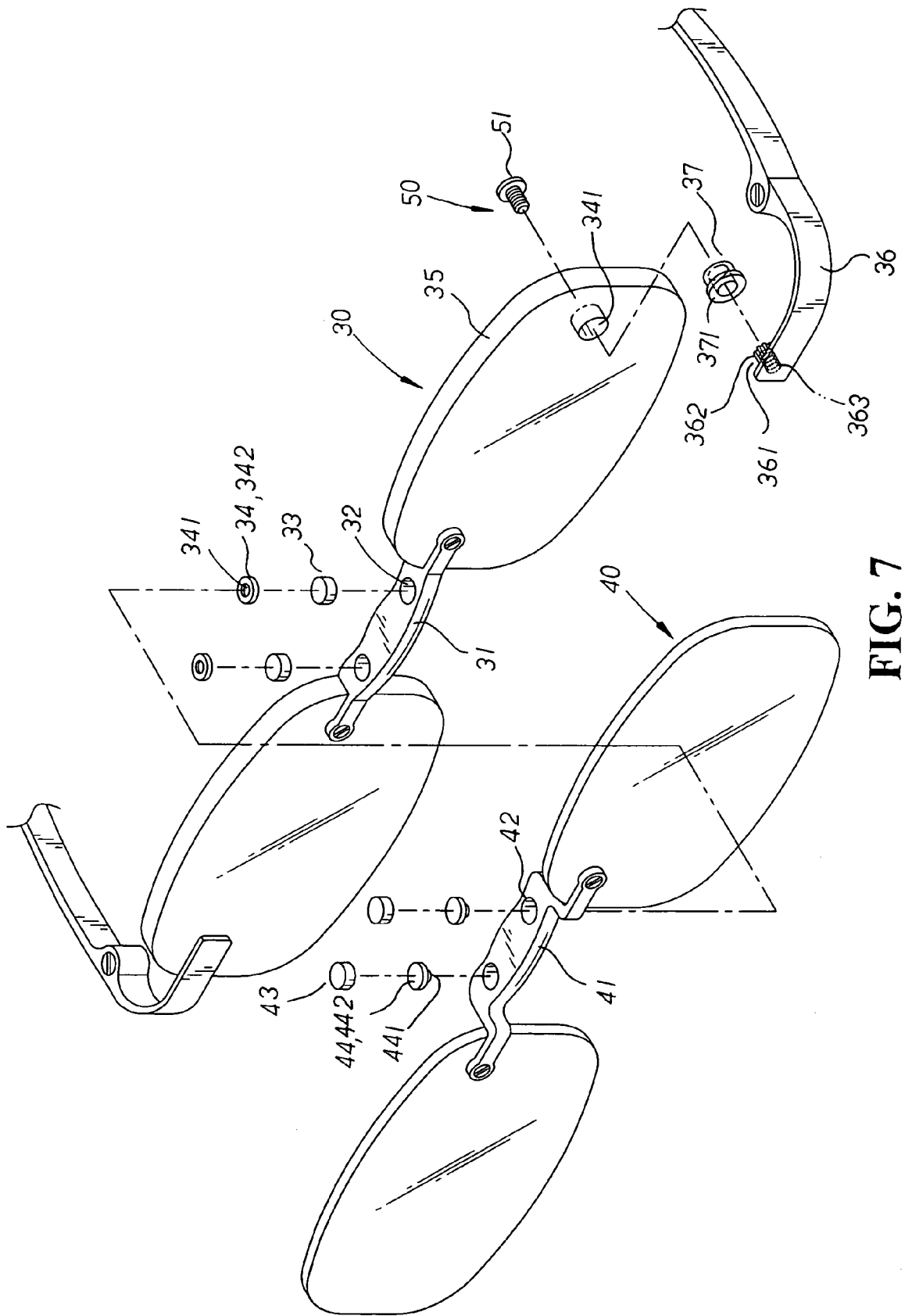
FIG. 7 is an exploded perspective view of the present invention.
Figure 8:
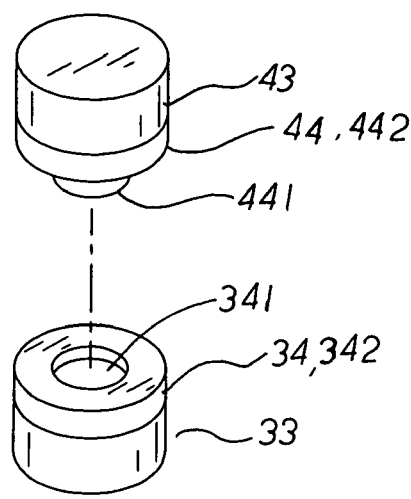
FIG. 8 is an enlarged view of a magnetic element fastened with an attracting element and another magnetic element bound with an attracted element thereof.
Figure 9:
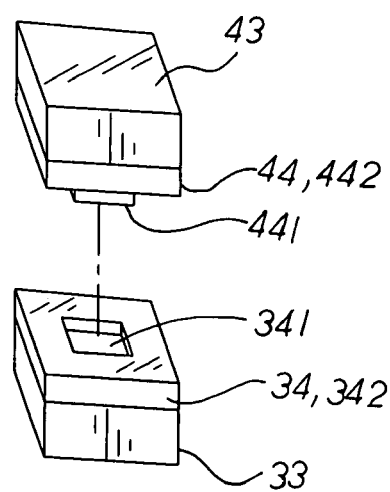
FIG. 9 is another enlarged view of the magnetic element with the attracting element and the magnetic element with the attracted element of the present invention.
Figure 10:
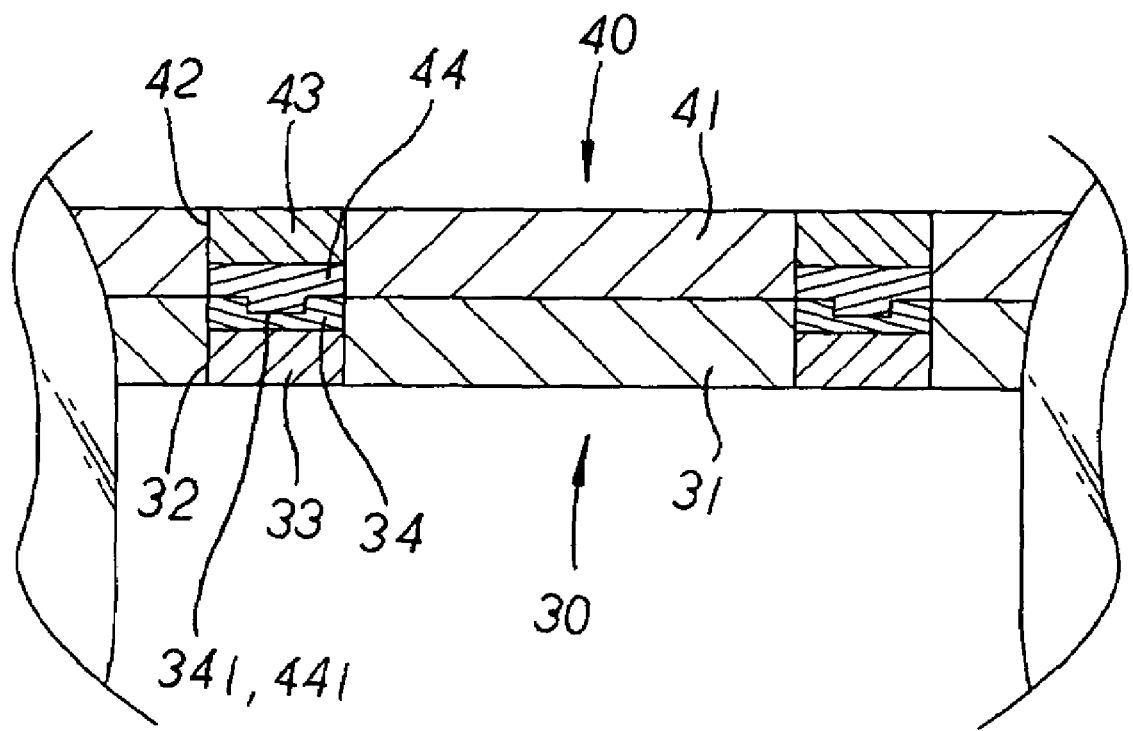
FIG. 10 is an assembled cross sectional view of a main glasses unit and an accessory glasses unit of the present invention.
Figure 11:
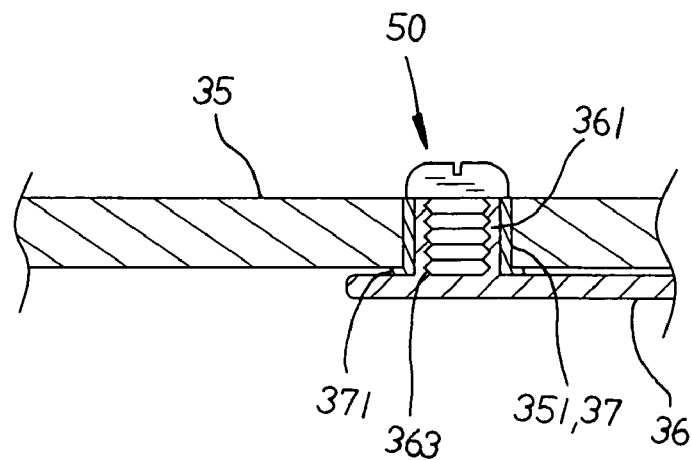
FIG. 11 is an assembled cross sectional view of a glass and a temple hinge of the present invention.
Figure 12:
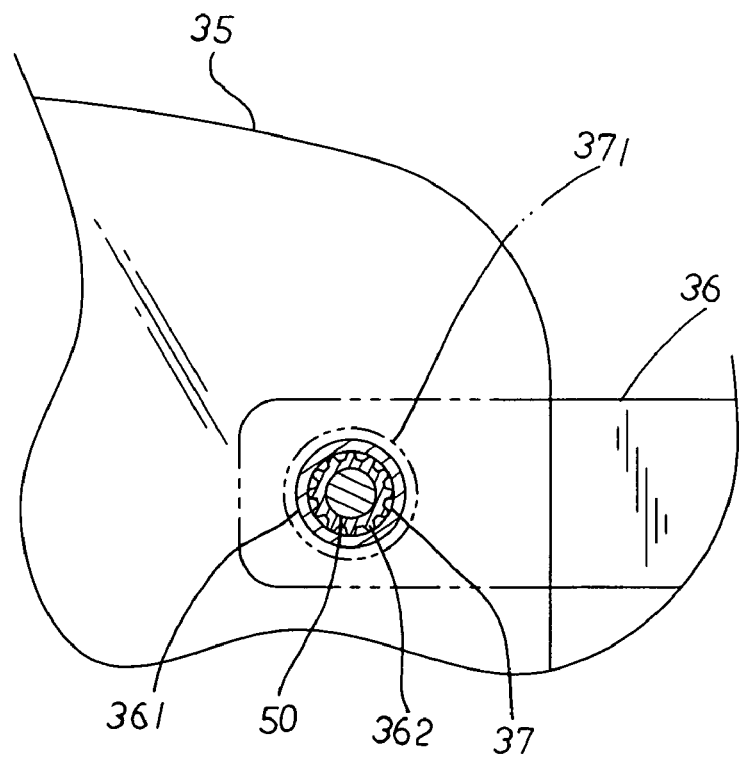
FIG. 12 is another assembled cross sectional view of the glass and the temple hinge of the present invention.

Please refer to FIG. 7 showing an exploded perspective view of the present invention (accompanied by FIGS. 8, 9, 10). The present invention relates to an eyewear structure combinable with an accessory glasses unit, comprising a main glasses unit 30, and an accessory glasses unit 40 each equipped with a bridge 31, 41 wherein both left and right sides of each bridge 31, 41 have an assembly bore 32, 42 (of various shapes such as circle, square, triangle, and diamond, etc.) drilled at an appropriate position thereon respectively, and into the assembly bore 32, 42 is respectively embedded an identical-shaped magnetic element 33, 43. The magnetic elements 33, 43 thereof are respectively combined with an attracting element 34 and an attracted element 44 at one side wherein the attracting element 34 and the attracted element 44, made of stainless steel or iron pieces and equipped with magnetic conducting capability, are respectively provided with an assembly section 342, 442 at one side. The assembly section 342 of the attracting element 34 has an insert groove 341 defining thereon, and the assembly section 442 of the attracted element 44 has an insert rod 441 protruding thereon. Therefore, via the magnetism generated by the magnetic elements 33, 43, the attracted elements 44 of the accessory glasses unit 40 and the attracting elements 34 of the main glasses unit 30 can be magnetically attached to one another for positioning thereby as shown in FIG. 10. Meanwhile, the insert rods 441 of the attracted elements 44 are allowed to accurately fit into the insert grooves 341 of the attracted elements 34 to obtain the purposes of magnetic attraction as well as insert positioning thereby so that the accessory glasses unit 40 can be stably clipped in place onto the main glasses unit 30 without the risk of sliding around as found in the aforementioned prior art, achieving better stability thereby. Thus, the main glasses unit 30 and the accessory glasses unit 40 are featured by lightweight and flexible application, and are made more competitive in the market. Furthermore, the main glasses unit 30 is equipped with a pair of glasses 35 each having a restricting hole 351 drilled at a preset position of the outer surface (either at one or both left and right sides thereon) and extending through to the inner surface thereof. The restricting hole 351 can be shaped into various forms like circle, rectangle, triangle, diamond, trapezoid, oblong with arcuate short sides, or oblong with tapered short sides, etc. And the main glasses unit 30 also includes a set of temple hinges 36 each having a restricting protrusion 361 extending at the inner surface of the front portion thereon and identically-shaped like the restricting hole 351 to fit to the restricting hole 351 in mutual engagement therewith as shown in FIGS. 11, 12. The restricting protrusion 361 whose size is slightly larger than the inner caliber of the restricting hole 351 has multiple insert ribs 362 extending in equal spacing at the outer surface thereon to abut tight against the inner surface of the restricting hole 351 so that the temple hinge 36 can be stably held in place onto the glass 35 thereby. The restricting protrusion 361 also has a screw hole 363 disposed therein to which a locking element 50 with a head 51 is secured so as to fix the glass 35 precisely onto the temple hinge 36, permitting a more lightweight and burden-free application of the rimless glasses thereby. In addition, a hollow protective plug 37 made of flexible plastic is mounted between the restricting hole 351 of the glass 35 and the restricting protrusion 361 of the temple hinge 36 so as to prevent the restricting protrusion 361 from abrading against the inner surface of the restricting hole 351 when the temple hinge 36 is assembled onto the glass 35 thereof. And, the protective plug 37 has a flexible pad 371 protruding at the outer periphery of one end to abut against the outer periphery at one side of the restricting hole 351 of the glass 35 and secure tight thereto via the locking element 50 so that the temple hinge 36 won't directly contact with the glass 35 in the locking process thereof, efficiently exerting a complete protection of the glass 35 and boosting its quality thereby. The inner caliber of the protective plug 37 is smaller than the restricting protrusion 361 so as to wrap tight around the outer periphery of the restricting protrusion 361 and flexibly bind with the insert ribs 362 with an anti-slippery effect generated thereby. Meanwhile, the protective plug 37 is correspondingly clamped tight between the restricting protrusion 361 and the restricting hole 351 and flexibly bound there-between to generate close and firm positioning effect, permitting the glass 35 to precisely fix onto the temple hinge 36 thereby. Via the protective plug 37 utilized to separate the restricting hole 351 and the restricting protrusion 361 thereof, the glass 35 can avoid the abrasion thereof. In addition, the protective plug 37 can also be easily replaced in case of flexible fatigue due to the long-time abutment of the restricting protrusion 361, efficiently reducing the replacement rate of the conventional glasses. And, in the manufacturing process thereof, the glass 35 can have the restricting hole 351 drilled onto the appropriate position thereon to which the restricting protrusion 361 of the temple hinge 36 can be easily mounted without the trouble of aligning and correcting their positions thereof, facilitating easier and faster manufacturing process thereby.

Furthermore, both left and right sides of the glass 35 can have a restricting hole 351 drilled thereon respectively for the mounting the restricting protrusion 361 of the temple hinge 36 and a restricting protrusion of the bridge (non-illustrated in the diagram).

Besides, the magnetic elements 33, 43 can be respectively bound with the attracting element 34 and the attracted element 44 via adhesive fastening, and the assembly sections 342, 442 of the attracting element 34 and the attracted element 44 are precisely engaged with the assembly bores 32, 42 to form an even plane therewith respectively.

Figure 13:
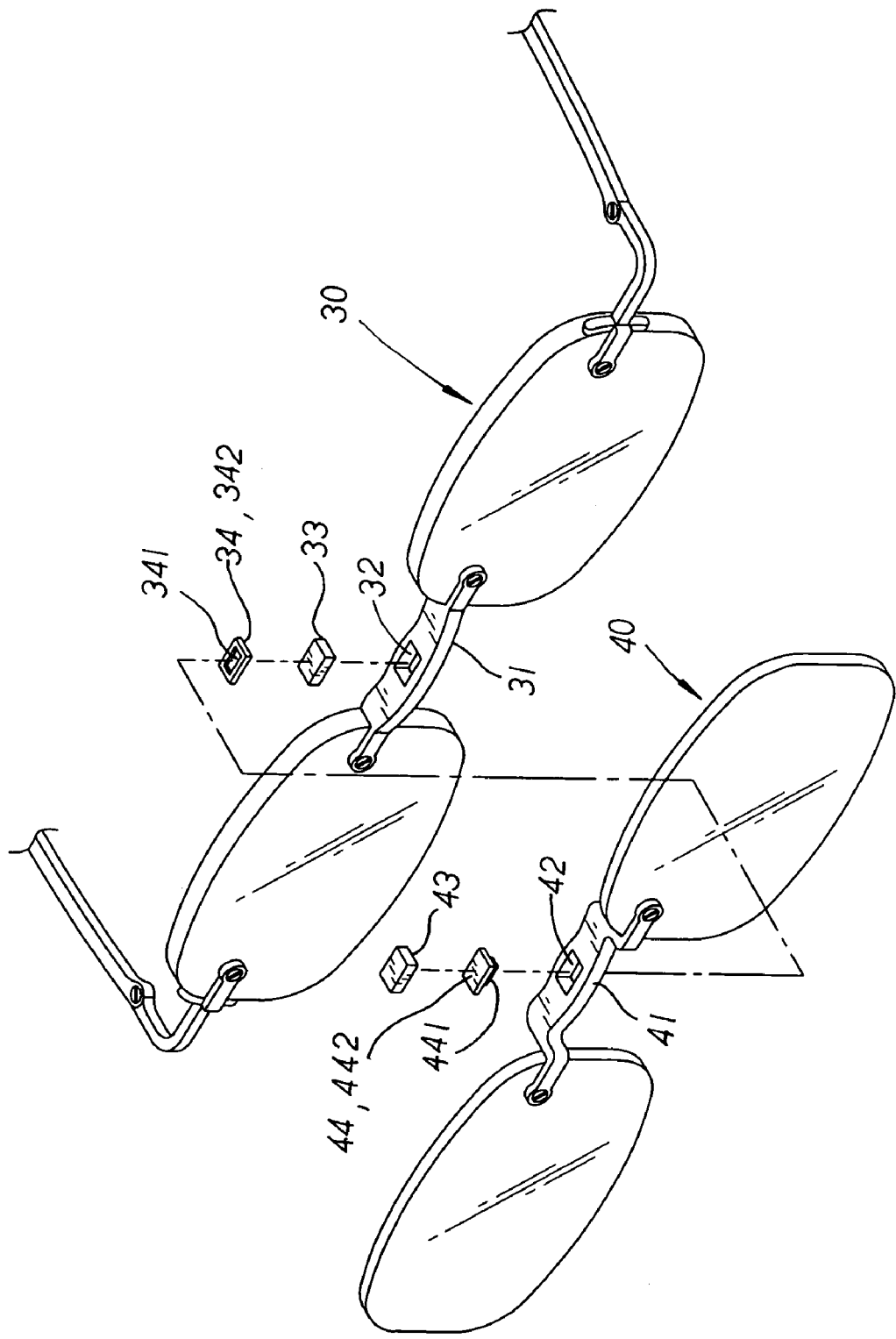
FIG. 13 is an exploded perspective view of another embodiment of the present invention.

Please refer to FIG. 13. The bridges 31, 41 of the main glasses unit 30 and the accessory glasses unit 40 can also have a rectangular assembly bore 32, 42 extending through the middle section thereof for the embedment of a magnetic element 33 with an attracting element 34 attached thereto, and a magnetic element 43 with an attracted element 44 fastened thereto respectively. The attracting element 34 and the attracted element 44 are respectively equipped with an assembly section 342, 442 at one side wherein the assembly section 342 of the attracting element 34 has an insert groove 341 defining thereon, and the assembly section 442 of the attracted element 44 has an insert rod 441 protruding thereon to fit to the insert groove 341 for the purposes of magnetic attraction as well as insert positioning thereby.

Figure 14:
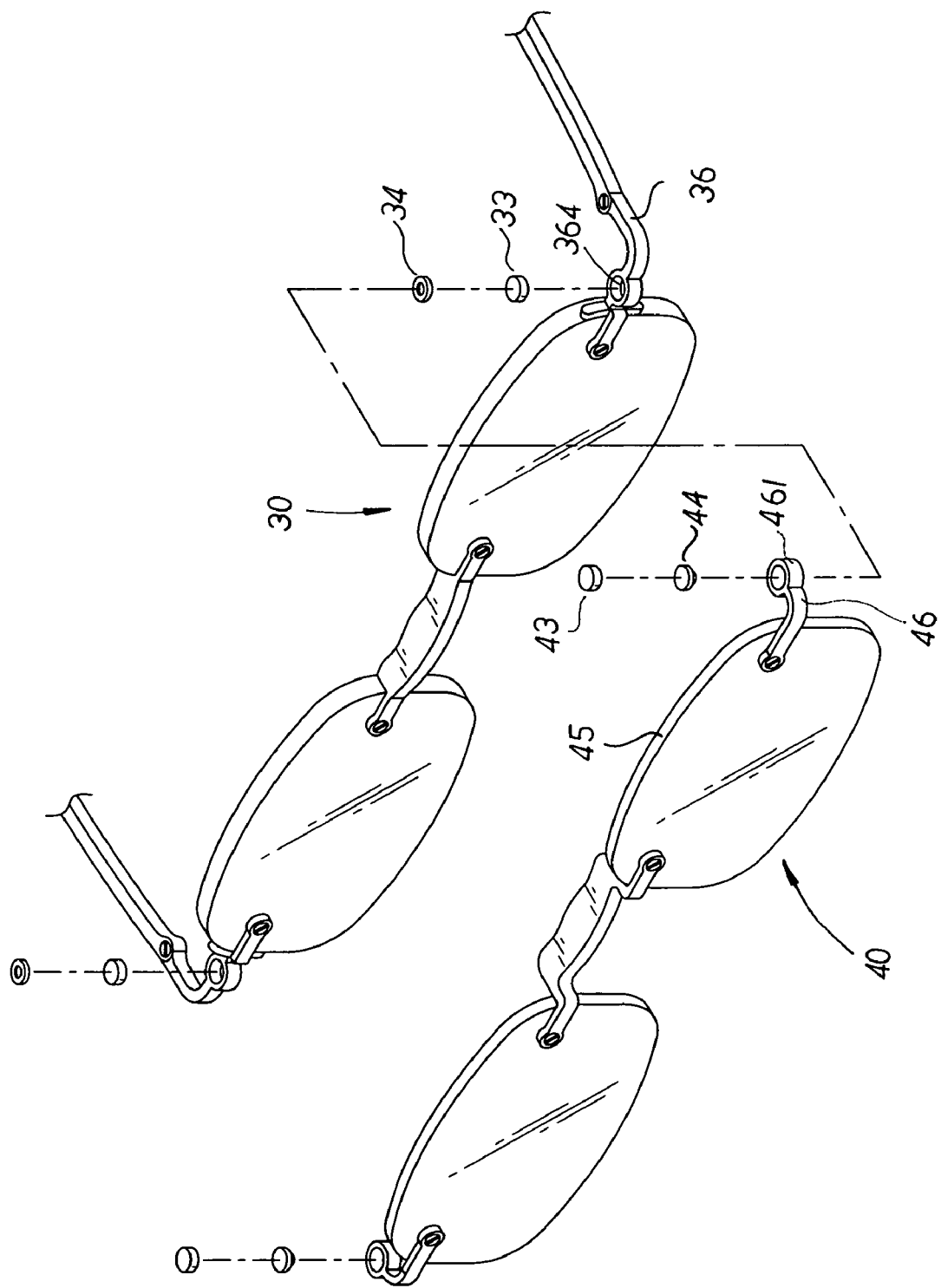
FIG. 14 is an exploded perspective view of a third embodiment of the present invention.

Please refer to FIG. 14. An assembly bore 364, 461 can also be respectively disposed at the front portion of the temple hinge 35, and at a frame element 46 fixed to the corresponding outer lateral sides of a pair of glasses 45 of the accessory glasses unit 40. And a magnetic element 33 with an attracting element 34 attached thereto and another magnetic element 43 with an attracted element 44 fastened thereto are respectively embedded into the assembly bores 364, 461 therein. The attracting element 34 and the attracted element 44 are respectively equipped with an assembly section 342, 442 at one side wherein the assembly section 342 of the attracting element 34 has an insert groove 341 defining thereon, and the assembly section 442 of the attracted element 44 has an insert rod 441 protruding thereon to fit to the insert groove 341 for the purposes of magnetic attraction as well as insert positioning thereby.

Figure 15:
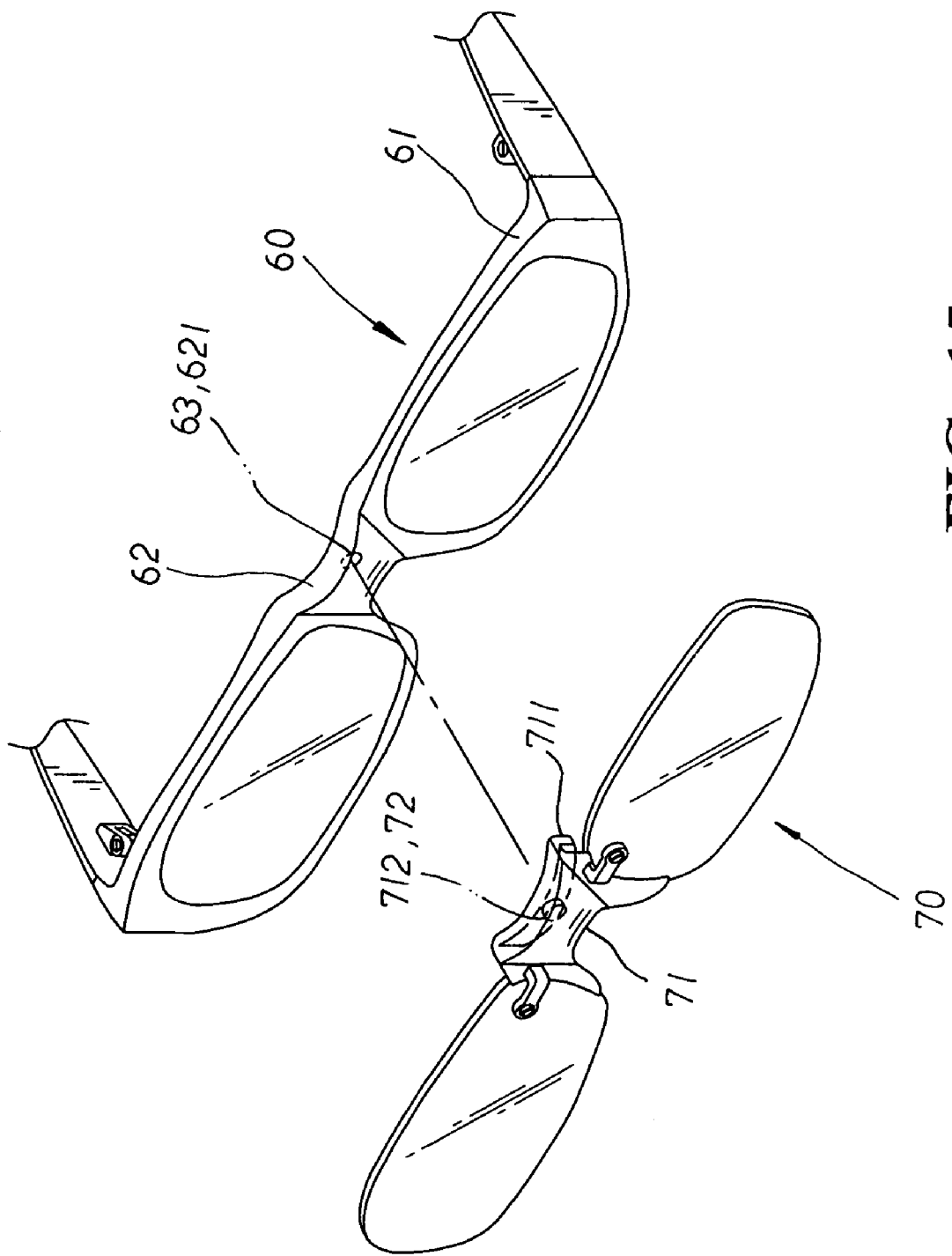
FIG. 15 is an exploded perspective view of a fourth embodiment of the present invention.

Please refer to FIG. 15. The present invention can also include a main glasses unit 60 having a plastic frame 61 wherein the plastic frame 61 is equipped with a bridge 62 whose inner surface is defined by an assembly bore 621 for the embedment of an attracting element 63 therein. An accessory glasses unit 70 has a matching bridge 71 identically shaped like the bridge 62 of the plastic frame 61 and equipped with an L-shaped insert piece 711 bending inwards. An assembly bore 712 is disposed defining one side surface of the insert piece 711 thereon for the embedment of an attracted element 72 therein to fit to the attracting element 63 for magnetic attachment and insert positioning as well thereby.

Figure 16:
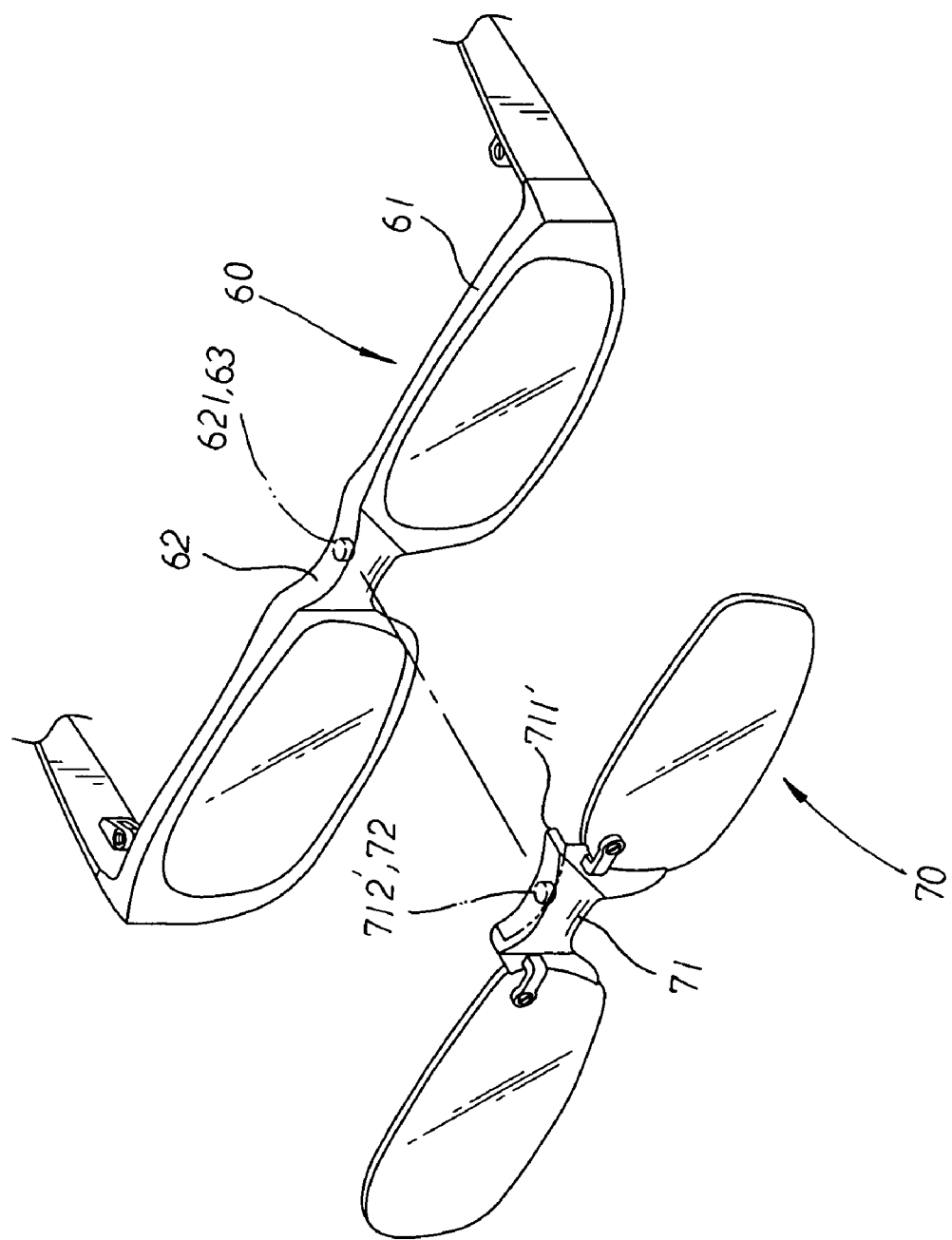
FIG. 16 is another exploded perspective view of FIG. 15.

Please refer to FIG. 16. An assembly bore 621 can also be provided on the top surface of the bridge 62 of the plastic frame 61 for the embedment of the attracting element 63 therein. And an abutment piece 711' identically shaped like the bridge 62 of the plastic frame 61 is disposed bending inwards at the bridge 71 of the accessory glasses unit 70 thereon. The abutment piece 711' has an assembly bore 712' defining the inner surface thereon for the embedment of the attracted element 72 therein to fit to the attracting element 63 for magnetic attachment and insert positioning as well thereby.

What is claimed is:

1. An eyewear structure combinable with an accessory glasses unit, comprising a main glasses unit and an accessory glasses unit each equipped with a bridge having assembly bores drilled at appropriate positions thereon for the embedment of magnetic elements therein respectively so that, via the magnetism generated by the reciprocally attracted magnetic elements, the accessory glasses unit can be stably clipped in place onto the main glasses unit thereby; the present invention being characterized by that, the magnetic elements of the main glasses unit and the accessory glasses unit being respectively combined with an attracting element and an attracted element at one side wherein the attracting element and the attracted element, having magnetic conducting capability, are respectively equipped with an assembly section at one side, and the assembly section of the attracting element has an insert groove defining thereon while the assembly section of the attracted element has an insert rod protruding thereon; therefore, via the magnetism generated by the magnetic elements, the attracted elements of the accessory glasses unit and the attracting elements of the main glasses unit can be magnetically attached to one another for positioning thereby; besides, the insert rods of the attracted elements are allowed to accurately fit to the insert grooves of the attracting elements to obtain the purposes of magnetic attraction as well as insert positioning so that the accessory glasses unit can be stably clipped in place onto the main glasses unit for location thereby.

2. The eyewear structure combinable with an accessory glasses unit as claimed in claim 1 wherein the main glasses unit is equipped with a pair of glasses each having a restricting hole drilled at a preset position of the outer surface through to the inner surface thereon; the main glasses unit also includes a set of temple hinges each having a restricting protrusion identically-shaped like the restricting hole and extending at the inner surface of the front portion thereon to fit to the restricting hole thereby wherein multiple insert ribs are disposed extending at the outer surface of the restricting protrusion thereon to abut tight against the restricting hole thereby; furthermore, a hollow protective plug made of flexible plastic is applied to mount between the restricting hole and the restricting protrusion thereof.

3. The eyewear structure combinable with an accessory glasses unit as claimed in claim 2 wherein the restricting protrusion of the temple hinge has an outer periphery slightly larger than the inner caliber of the restricting hole thereof.

4. The eyewear structure combinable with an accessory glasses unit as claimed in claim 2 wherein the restricting hole of the glass can be shaped into various forms like circle, rectangle, triangle, diamond, trapezoid, oblong with arcuate short sides, or oblong with tapered short sides, etc.

5. The eyewear structure combinable with an accessory glasses unit as claimed in claim 2 wherein the restricting protrusion of the temple hinge thereof has a screw hole disposed therein to which a locking element with a head is secured therewith.

6. The eyewear structure combinable with an accessory glasses unit as claimed in claim 2 wherein the protective plug has a flexible pad protruding at the outer periphery of one end edge thereon to abut against one side of the restricting hole of the glass thereby.

7. The eyewear structure combinable with an accessory glasses unit as claimed in claim 1 wherein the assembly bores of the main glasses unit and the accessory glasses unit are drilled at both left and right sides of the bridges thereon into which the identically-shaped attracting elements and the attracted elements are respectively embedded and located in position thereby.

8. The eyewear structure combinable with an accessory glasses unit as claimed in claim 1 wherein the assembly bores of the main glasses unit and the accessory glasses unit can also be drilled in the middle sections of the bridges thereon into which the identically-shaped attracting elements and the attracted elements are respectively embedded and located in position thereby.

9. The eyewear structure combinable with an accessory glasses unit as claimed in claim 1 wherein the assembly bores of the main glasses unit and the accessory glasses unit can be shaped into different forms like circle, rectangle, triangle, or diamond, etc.

10. The eyewear structure combinable with an accessory glasses unit as claimed in claim 1 wherein the attracting elements and the attracted elements thereof can be made of stainless steel or iron pieces, and the assembly sections of the attracting and attracted elements are precisely engaged with the assembly bores of the main glasses unit and the accessory glasses unit to form an even plane therewith respectively.

* * * * *